United States Patent [19]
Choi

[11] Patent Number: 5,539,717
[45] Date of Patent: Jul. 23, 1996

[54] PLAYER FOR REPRODUCING BOTH MINIDISC AND COMPACT DISC

[75] Inventor: Hyungho Choi, Kyeongki-Do, Rep. of Korea

[73] Assignee: Daewoo Electronics Co., Ltd., Seoul, Rep. of Korea

[21] Appl. No.: 357,280

[22] Filed: Dec. 13, 1994

[30] Foreign Application Priority Data

Dec. 13, 1993 [KR] Rep. of Korea .................. 93-27413

[51] Int. Cl.⁶ ................................. G11B 17/035
[52] U.S. Cl. ................... 369/75.2; 369/77.2; 369/192; 369/197; 360/98.01
[58] Field of Search ................. 369/14, 15, 34, 369/36, 37, 75.2, 77.1, 77.2, 191, 192, 197, 258, 265; 360/98.01, 99.01–.03, 99.06–.07

[56] References Cited

U.S. PATENT DOCUMENTS

| | | | |
|---|---|---|---|
| 5,105,414 | 4/1992 | Funabashi et al. | 369/75.2 |
| 5,109,372 | 4/1992 | Caspers et al. | 369/75.2 |
| 5,218,592 | 6/1993 | Isshiki et al. | 369/197 |
| 5,299,185 | 3/1994 | Sakurai et al. | 369/75.2 |
| 5,301,176 | 4/1994 | Kawachi et al. | 369/75.2 |
| 5,301,177 | 4/1994 | Kumakura | 369/75.2 |

FOREIGN PATENT DOCUMENTS 61-233465 10/1986 Japan ...................... 369/77.2

*Primary Examiner*—John H. Wolff
*Assistant Examiner*—Paul J. Ditmyer
*Attorney, Agent, or Firm*—Lowe, Price, LeBlanc & Becker

[57] ABSTRACT

Disclosed is a disc player for reproducing a minidisc and a compact disc. The disc player includes a disc tray and a base plate. The disc tray has a compact disc and minidisc mounting parts placed on the upper surface thereof, cut portions to expose the discs to a pickup, a rack gear disposed on a lower edge of one side wall thereof and first cam grooves disposed on both side walls thereof. The base plate has a rectangular cut portion formed at a center thereof enabling the pickup to read out data from the discs and first shafts projected from both side walls thereof to be inserted into the first cam grooves of the tray. An outer chassis having first vertical cut portions is formed on both side walls to guide the elevating movement of the first shafts. A pickup feeding device is secured to a bottom surface of the base plate. A compact disc turntable and a minidisc turntable are secured respectively to a front center and a rear center of the rectangular cut portion of the base plate. A loading device is secured to one side wall of the outer chassis. The number of components is reduced and the simple structure can be achieved. Also, the minidisc and compact disc are mounted thereon at the same time, so that they can be driven selectively according to a user' needs.

7 Claims, 5 Drawing Sheets

5,539,717

PLAYER FOR REPRODUCING BOTH MINIDISC AND COMPACT DISC

BACKGROUND OF THE INVENTION

1. Field of the Invention

The present invention relates to a disc player for reproducing both a minidisc and a compact disc and more particularly, to a disc player for reproducing both a minidisc and a compact disc by using a single pickup device.

2. Description of the Prior Art

Nowadays, a variety of disc players are used for reproduction of only one kind of disc. So, when a user wants to obtain some information from other kinds of discs, e.g., minidisc (MD) and compact disc (CD), he may be required to buy a new disc player applicable thereto. Also, although in general compact disc player (CDP), there have been manufactured disc players which can play discs with different sizes, e.g. CD and laser disc (LD), that may be used only in case of a reproduction of the same kind of disc. Lately, a disc player capable of playing a naked disc as well as a cartridge-encased disc (hereinafter, cartridge) like the above players has been proposed. Such player capable of reproducing both the naked disc and the cartridge-encased disc is disclosed in U.S. Pat. No. 5,299,185. The structure and operation of the disc player as an example are described as follows.

FIG. 1 is a perspective view for illustrating a state of a disc player loading a naked disc and reading out some data. As shown in the figure, the conventional disc player includes a disc tray 20 for receiving a naked disc 100; a cartridge carrying device for carrying a cartridge 110; a chucking device for chucking naked disc 100; a turntable for driving naked disc 100 and cartridge 110; sensors for sensing positions of the above components; and a controller for controlling positions of the above components. The disc player further includes a mouth panel 3 for insertion and ejection of naked disc 100 and cartridge 110.

First of all, process of loading and driving naked disc 100 by the disc player will be explained. When an eject switch is pushed, a lid 70 is pivoted upward to open a slot 4 of mouth panel 3. An electric motor 38 of a disc tray driving mechanism 30 is also energized to rotate in one direction, so that disc tray 20 is moved forward from the standby position (not shown) and ejected through slot 4 in a mouth panel 3 direction (hereinafter, front direction).

Naked disc 100 is put on a disc placing depression (not shown) formed on disc tray 20. When the eject switch is again pushed, electric motor 38 is energized to rotate in the other direction, so that disc tray 20 slides into a housing (not shown) together with naked disc 100 in the same manner as that of a conventional disc tray carrying member. Since a pivotal chassis (not shown) is kept in the lower position, the inward movement of disc tray 20 is smoothly carried out without being blocked by a turntable and an optical pickup (not shown). When disc tray 20 comes to the given position where a bent portion 25A of a connecting plate 25 secured to disc tray 20 faces a photo sensor 41, sensor 41 senses that disc tray 20 has reached the loading-completed position and stops electrical motor 38. When a third photo sensor (not shown) which is positioned just below a peephole of disc tray 20 senses that naked disc 100 is present on the disc placing depression, the motor (not shown) is energized to cause a first cylindrical cam (not shown) and a second cylindrical cam 56 to turn in a given direction. The pivotal chassis is pivoted upward to the upper position lifting the turntable and the optical pickup to their working positions and at the same time, a chucking arm 60 is pivoted downward to its working position. Then, naked disc 100 is rotatably clamped by a chucking plate 64 of chucking arm 60.

Under this condition, when a play start switch (not shown) is pushed, the turntable is driven by a spindle motor (not shown) for turning naked disc 100 and the optical pickup is moved radially for reading information from naked disc 100. After stopping the reading of information from naked disc 100, disc tray 20 is ejected outside by the eject switch. At that time, disc tray 20 from which naked disc 100 is removed is inserted into the housing and stopped at the standby position.

Next, a process for insertion of cartridge 110 will be explained. FIG. 2 is a plan view for illustrating a state of loading and playing the cartridge in the disc player of FIG. 1. Before cartridge 110 is inserted into the disc player, disc tray 20 is always at the standby position. Without using the eject switch, cartridge 110 can be manually inserted into slot 4 without being obstructed by disc tray 20. The structure of a second cam groove 56B of second cylindrical cam 56 does not obstruct the opening of lid 70. When cartridge 110 comes to a given position in the housing, a shutter 113 of cartridge 110 is brought into abutment with a roller 98 of a shutter opening arm 96. Thus, the subsequent inward movement of cartridge 110 causes roller 98 to open shutter 113. During this operation, shutter opening arm 96 is pivoted counter-clockwise about first pivot shaft 95 against a spring 99. When cartridge 110 is further inserted into the housing, the leading right corner of a cartridge 110 comes to abutment with a pawl part 88A of a hook lever 88 causing a pivoting movement of hook lever 88 about a pivot shaft 89. A pint 88B of hook lever 88 is inserted into a recess 111 formed in cartridge 110 and pin 88B of hook lever 88 gets over a projection of a flip-flop lever 85, so that hook lever 88 clamps cartridge 110 with an aid of the flip-flop lever biased by a spring 86. When inserting cartridge 110 into the housing, the external force applied to cartridge 110 is transmitted to a link 82 through second pivot shaft 87, so that link 82 is moved rearwardly. The rearward movement of link 82 draws the cartridge 110 deeply into the housing due to the latched engagement between the cartridge 110 and the hook lever 88 mounted on the link 82. As a result, when disc tray 20 is present at the rearmost position, a photo sensor 45 operates to deenergize motor 38 shown in FIG. 1 to stop disc tray 20. Upon completion of the loading for cartridge 110, the third sensor (not shown) senses that cartridge 110 is present at the given position in the housing. A motor (not shown) is energized for the player to read out data from cartridge 110 through the similar process to that performed after completion of the loading of naked disc 100.

The disc player described the above can make playback of both naked disc and cartridge but can not reproduce two kinds of discs with different sizes such as minidisc and compact disc at the same time. Further, components for the loading and the driving of the naked disc and the cartridge are very complicatedly connected thereto, so that the reliability for the entire components may be seriously considered. Due to these components, the production cost is also increased.

SUMMARY OF THE INVENTION

It is an object of the present invention to provide a disc player for reproducing both minidisc and compact disc.

It is another object of the present invention to provide a disc player for loading both MD and CD.

It is still another object of the present invention to provide a simple structure of minidisc and compact disc player.

To accomplish the above objects, a disc player for reproducing a minidisc and a compact disc, comprising;

a disc tray having a compact disc mounting part disposed on an upper surface thereof, a minidisc mounting part secured to the upper surface thereof, cut portions formed thereon in alignment of central points of said minidisc and compact disc mounting parts to expose the compact disc and minidisc to a pickup, a rack gear disposed on a lower edge of one side wall thereof and first cam grooves disposed on side walls thereof;

a base plate having a rectangular cut portion formed at a center thereof so that the pickup may read out data from the compact disc and minidisc and first shafts projected from both side walls thereof to be inserted into said first cam grooves of said disc tray;

an outer chassis having first vertical cut portions formed on side walls thereof to guide the elevating movement of said first shafts;

a pickup feeding device secured to a bottom surface of said base plate;

a compact disc turntable and a minidisc turntable secured respectively to a front center and a rear center of said rectangular cut portion of said base plate; and a loading means for loading and/unloading the disc tray, secured to one side wall of said outer chassis.

In an embodiment according to the present invention, the MD and mounting parts are separately disposed, so that the MD and CD can be mounted at the same time.

In other embodiment according to the present invention, a photo sensor is mounted on the base plate so as to sense whether the MD and CD are placed thereon or not.

The disc player for reproducing MD and CD is simple in structure thereof, so that there can be sharply reduced the number of components as needed as well as the possibility of breakdown thereof due to such simple structure. In addition, it can selectively drive the MD and the CD according to a user's needs. Further, the present invention has benefits that different kinds of discs such as MD and CD which can not be played by the conventional disc player can be driven by means of a disc player according to the present invention.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Hereinafter, a preferred embodiment according to the present invention will be explained in detail. In the following description, "front direction" means an eject direction of a disc tray. Other directions are determined on the basis of the front direction.

Figure 1:
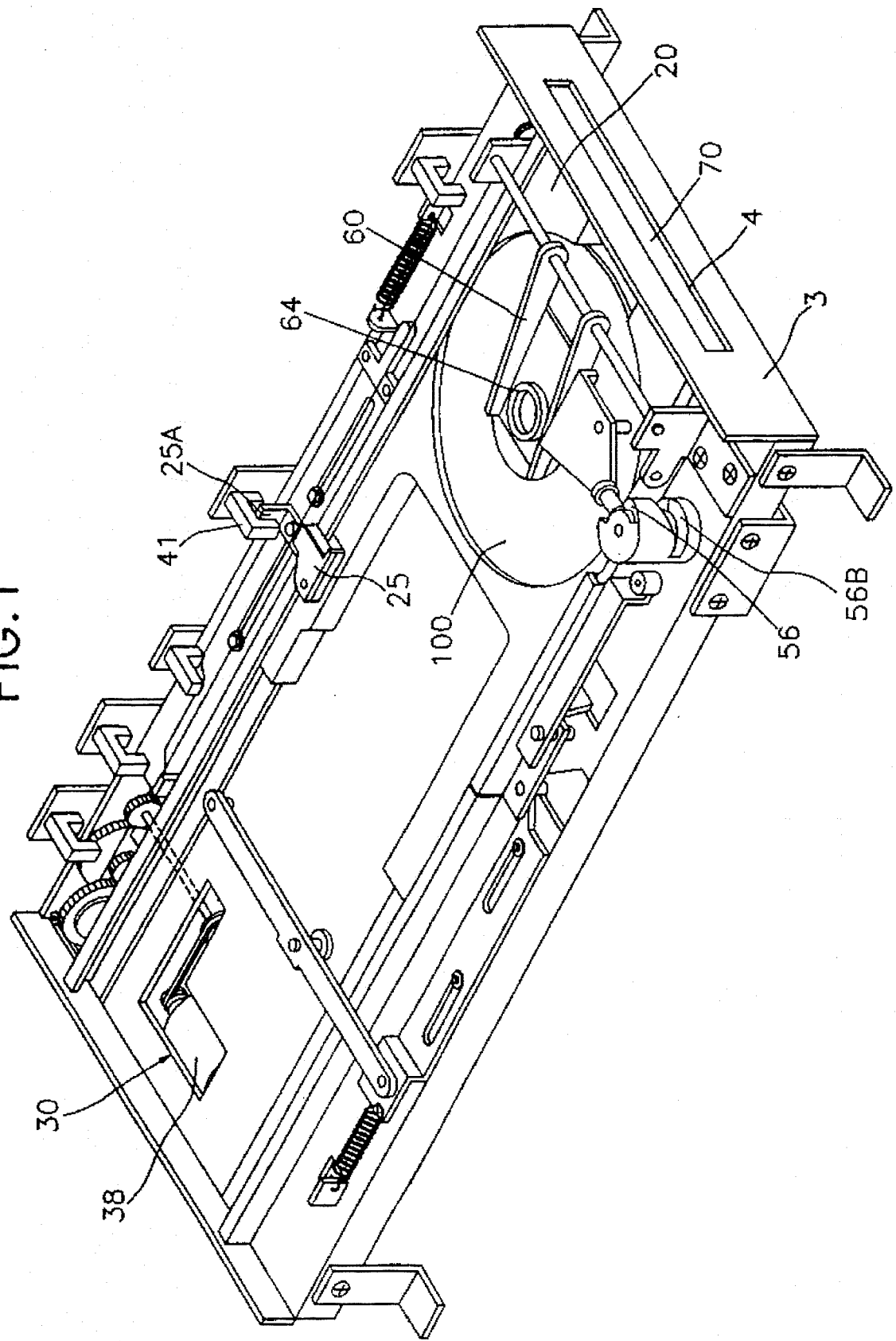
FIG. 1 is a perspective view for illustrating a state where a disc is loaded and read out in a prior art disc player.
Figure 2:
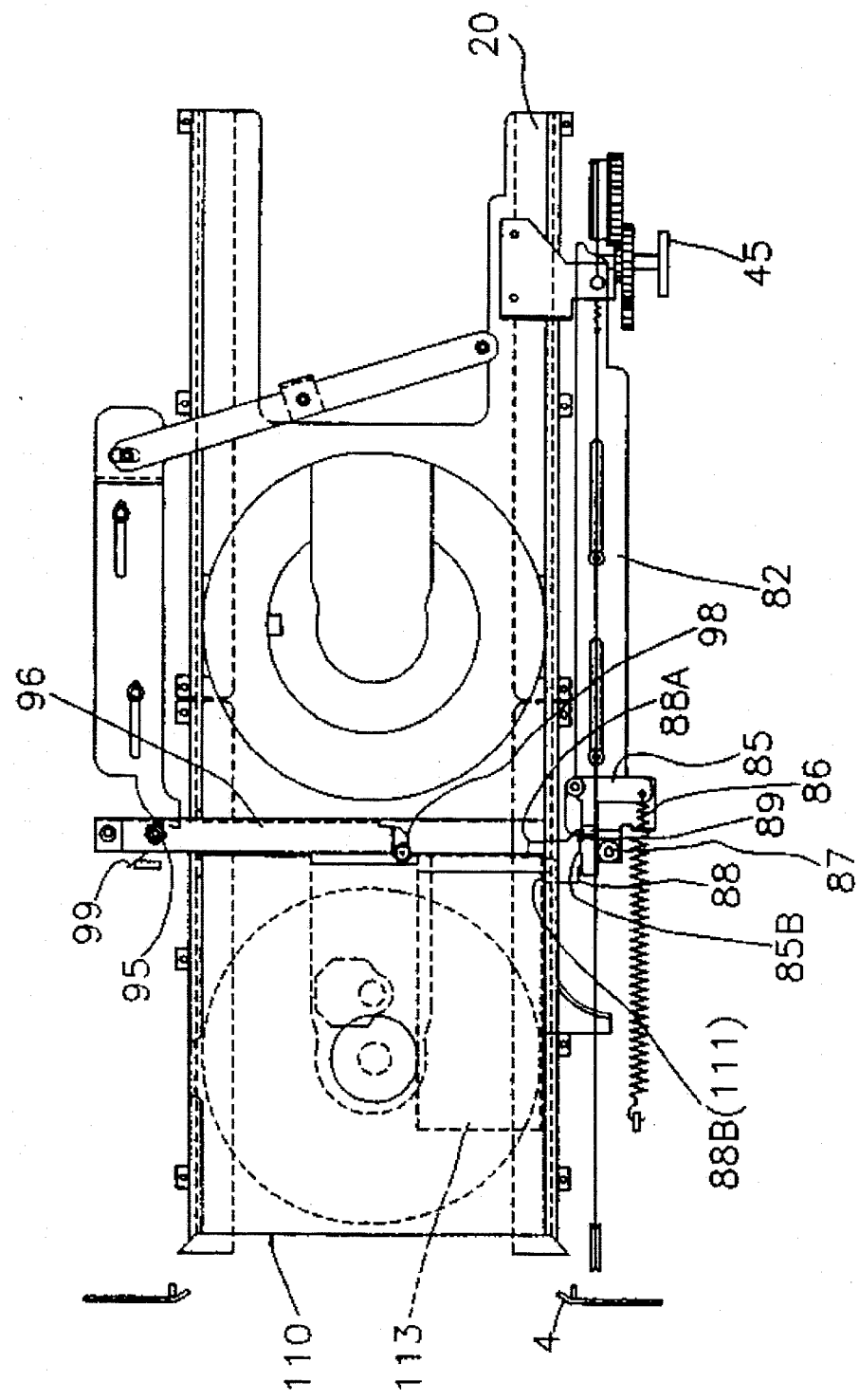
FIG. 2 is a plan view for illustrating a state that a cartridge-encased disc is loaded and read out in the prior art disc player of FIG. 1.
Figure 3:
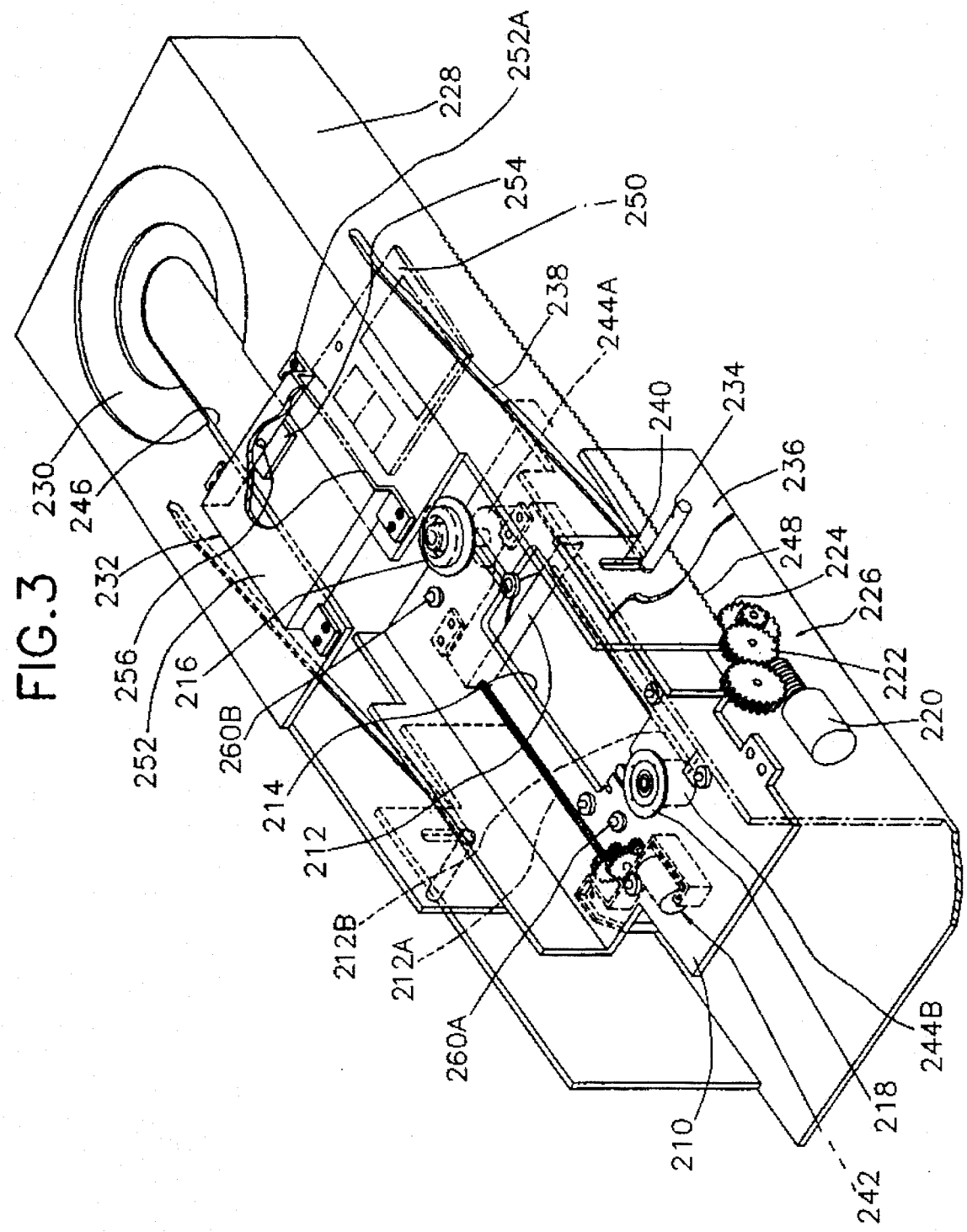
FIG. 3 is a perspective view for illustrating a disc player according to one embodiment of the present invention.

FIG. 3 is a perspective view for a disc player according to one embodiment of the present invention.

As shown in FIG. 3, there is schematically shown a player for both the MD and CD including an outer chassis 236, a base plate 210 and a disc tray 228.

A loading motor 220 which produces a driving force for fore and aft movements of disc tray 228 is disposed on one side wall of outer chassis 236. This driving force of loading motor 220 is transmitted to a transmittance gear 222 thereby rotating a carrying gear 224.

First vertical cut portions 240 are formed on both side walls of outer chassis 236, so that first shafts 234 projected from both side walls of base plate 210 can be guided by the fore and aft movements thereof.

CD mounting part 230 on which the CD can be mounted is disposed on a front side of an upper surface of disc tray 228. An elongated cut portion 246 is formed inward longitudinally along disc tray 228 from the center portion of the CD mounting part. Being moved within the elongated cut portion 246, pickup 212 can read out data from the discs mounted on MD and CD mounting parts 232 and 230.

First cam grooves 238 have the upper cut portion and the lower cut portion formed in parallel with the lower edge of side wall of tray 228 and an inclined cut portion elongated along the upper and lower cut portions of the tray. Thus, when disc tray 228 is moved in the fore and aft direction, first shaft 234 can be moved both horizontally and vertically.

MD mounting part 232 is projectingly attached across and above both side parts of elongated cut portion 246 formed on the upper surface of disc tray 228. The MD mounting part includes an MD cover 252, an MD shutter opening projection 256, a supporting piece 254 and fixing parts 252A. When MD cartridge 250 is inserted into MD cover 252, MD shutter opening projection 256 which is projected from the inner surface of MD cover 252 opens the shutter of MD cartridge 250. Supporting piece 254 is projected between the lower part of MD cover 252 and elongated cut portion 246 to possibly support MD cartridge 250. Fixing parts 252A which are disposed at lower parts of edges of MD cover 252 can secure MD cover 252 to disc tray 228.

Rectangular cut portion 214 is formed at a central part of base plate 210. A CD turntable 216 is placed at a front side of rectangular cut portion 214, so that the CD mounted on CD mounting part is put thereon. First spindle motor 244A for the driving of CD turntable 216 is secured to the lower part of CD turntable. Also, MD turntable 218 and second spindle motor 244B for the driving of MD cartridge mounted on MD mounting part 232 are disposed at a rear side of rectangular cut portion 214.

A feeding device 242 which is positioned between base plate 210 and outer chassis and secured to the lower part of base plate 210 rotates linear gear 212A, so that feeding device 242 can produce the driving force for a linear movement of pickup 212.

Also, photosensors 260A and 260B are disposed on base plate 210 so as to sense whether each of MD and CD is mounted on each of MD turntable 218 and CD turntable 216 or not.

Further, in addition to first shaft, 234, first cam groove 238 and first vertical cut portion 240, a second shaft, a second cam groove and second vertical cut groove are formed thereon, so that disc tray 228 can be better guided by a safe movement thereof.

A process for practical operation of the above-mentioned disc player for both the MD and CD will be detailedly described in the following.

First of all, loading motor 220 is rotated, so that transmittance gear 222 and carrying gear 224 are rotated thereby. A rotation force of carrying gear 224 is transmitted to rack gear 248 placed at the lower edge of the one side wall of disc tray 228 meshed therewith through which disc tray 228 is carried to the outside of outer chassis 236, so that the MD and CD can be mounted thereon (see FIG. 3). MD cartridge 250 and/or the CD are mounted on MD mounting part 232 of disc tray 228 and/or CD mounting part 230. At that time, when MD cartridge 250 is inserted into MD mounting part 232, the shutter of MD cartridge 250 is opened by MD shutter opening projection 256 projected within MD mounting part 232.

Upon finishing the mounting of the disc, loading motor 22 is rotated in a reverse direction against that of rotation of the loading motor in ejecting disc tray 228, so that disc tray 228 is introduced into outer chassis 236 by the movement of rack gear 248 and carrying gear 224. At that time, first shaft 234 projected from side walls of base plate 210 is guided by first cam grooves 238 cut in side walls of tray 228. Thus, tray 228 is moved horizontally toward the inner outer chassis 236 while elevating base plate 210.

When tray 228 is completely inserted into outer chassis 236, base plate 210 is elevated to be stuck fast to the lower surface of the tray 228. At the same time, MD turntable 218 and CD turntable 216 are definitely positioned to MD mounting part 232 and CD mounting part 230. Pickup 212 is elevated together with base plate 210, so that it can be linearly moved through cut portion 246 of disc tray 228.

Upon finishing the insertion of disc tray 228, photosensors 260A and 260B sense that MD cartridge 250 and/or the CD are mounted thereon, so that the feeding motor 242 is driven to position pickup 212 on the corresponding surface of selected disc. Then, the reproduction of data by pickup 212 is performed in the same manner as conventional methods. For example, when MD cartridge 250 is mounted thereon, second spindle motor 244 is operated to rotate MD turntable 218. Thus, during a recording medium (not shown) placed within MD cartridge placed on MD turntable is rotated by means of linear gear 212A, while at the same time, pickup 212 is linearly moved along a radius of recording medium, so that pickup 212 can read out data therefrom. Since the MD and the CD can be simultaneously mounted thereon, without the MD and the CD exchanging, the pickup can read out data from the MD or the CD by a movement of the MD to the CD or the CD to the MD.

Figure 4:
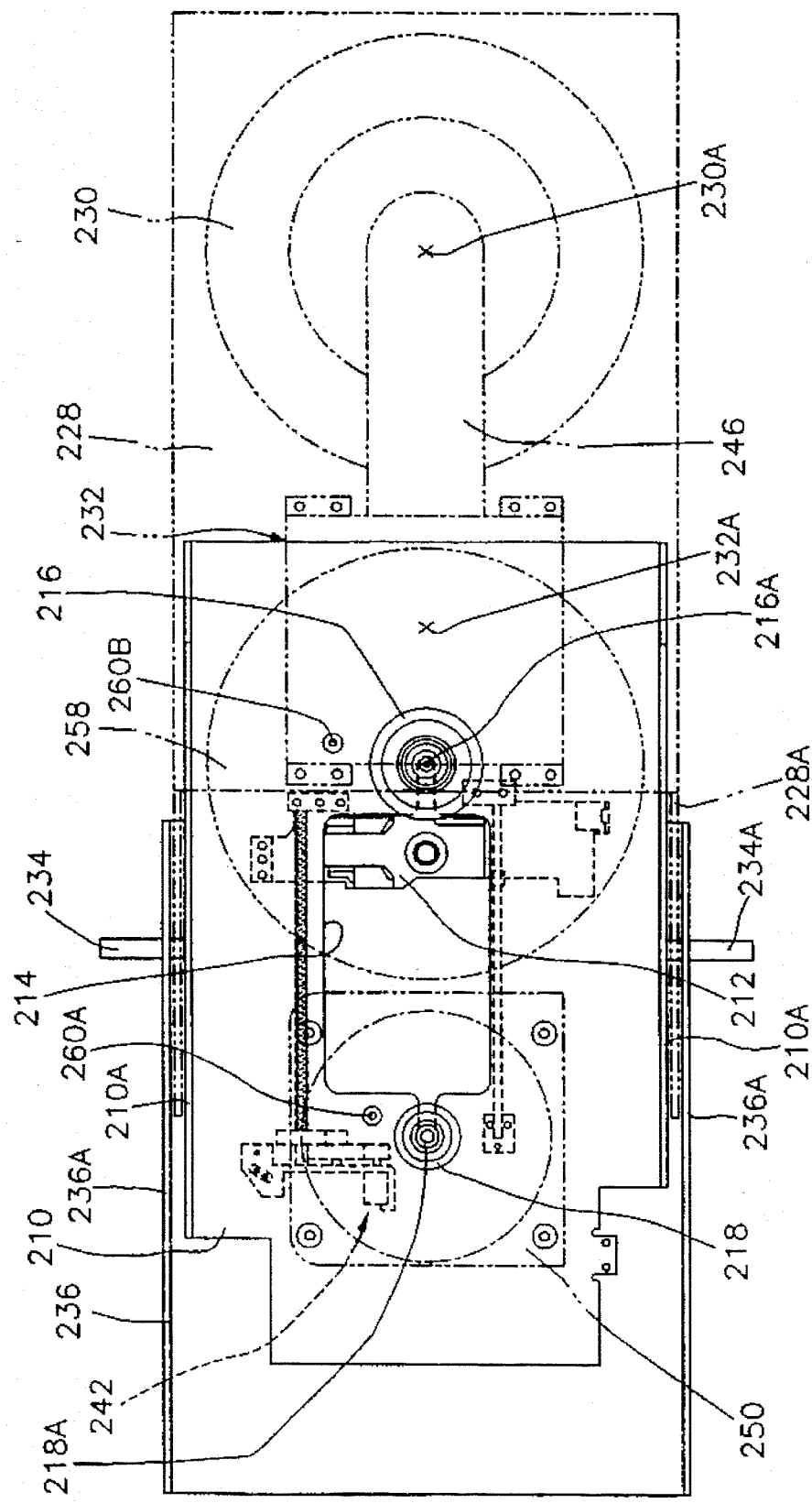
FIG. 4 is a plan view for a disc player as shown in FIG. 3.

FIG. 4 is a plan view for illustrating the disc as shown in FIG. 3. MD mounting part 232 and CD mounting part 230 are maintained at a minimum distance therebetween without any overlaying of each other, so that the MD and the CD can be mounted thereon at the same time. Side walls 236A of outer chassis 236 are placed at the outermost position of the player. Side walls 210A of base plate 210 are placed at the innermost position thereof. Side walls 228A of disc tray 228 are placed between side walls 236A and 210A thereof.

Figure 5:
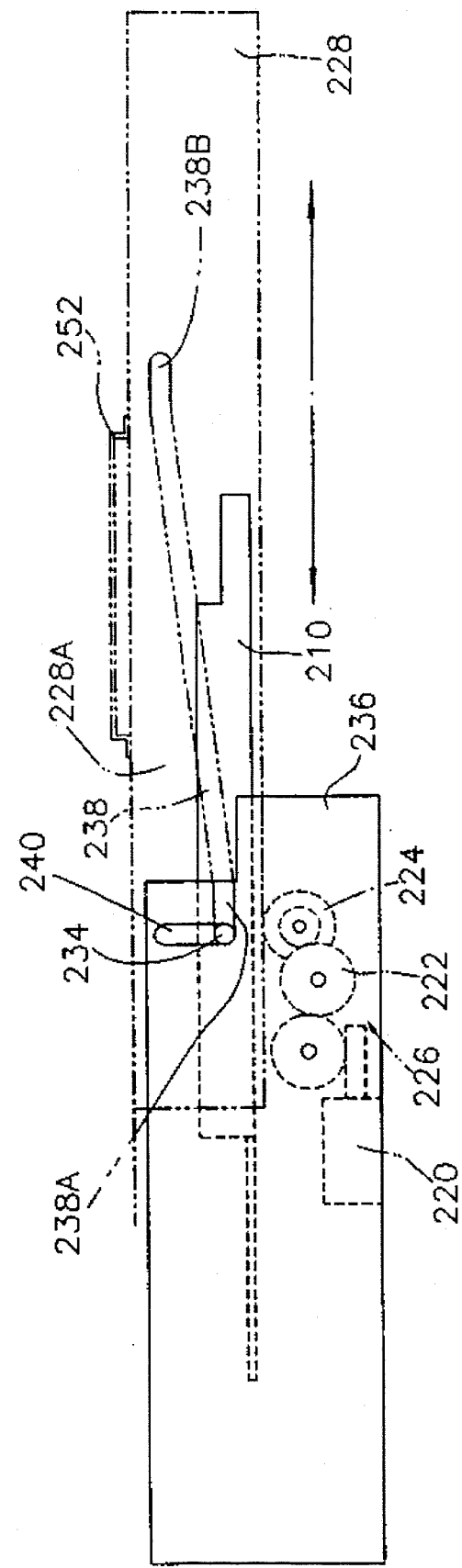
FIG. 5 is a side view for a disc player as shown in FIG. 3.

FIG. 5 is a side view for illustrating the disc player as shown in FIG. 3. When disc tray 228 is completely inserted thereinto, first cam grooves 238 formed on the side walls 228A of tray 228 should be placed in the following manner in order that the central point 230A of CD mounting part 230 is coincided with the central point 216A of CD turntable 216. As shown in FIG. 4, first shafts 234 are placed between the central point 218A of MD turntable 218 and the central point 216A of CD turntable 216 disposed on base plate 21. So, as shown in FIG. 5, the upper and 238B of first cam groove 238 should be positioned on side walls 228A of disc tray 28, in order that central point 232A of MD mounting part 232 is coincided with that 218A of MD turntable 218 and that 230A of CD mounting part 230 is coincided with that 216A of CD turntable 216.

The disc player reproducing both the CD and the MD according to the present invention has the sharply reduced number of components and the simple structure as well as the reduced possibility of breakdown thereof due to the simple structure compared with the conventional disc players. Also, since the MD and the CD are mounted thereon at the same time, the MD and the CD can be driven selectively according to a user's necessity. Different kinds of discs, e.g., MD and CD, can be driven by only one disc player, which was not realized in the conventional players. Further, the compact structure of disc player for reproducing both MD and CD can be made.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. A disc player for reproducing a minidisc and a compact disc, comprising;

a disc tray having a compact disc mounting part disposed on an upper surface thereof, a minidisc mounting part secured to the upper surface thereof, cut portions formed thereon in alignment of central points of said minidisc and compact disc mounting parts to expose the compact disc and minidisc to a pickup, a rack gear disposed on a lower edge of one side wall thereof and first cam grooves disposed on side walls thereof;

a base plate having a rectangular cut portion formed at a center thereof so that the pickup may read out data from the compact disc and minidisc and first shafts projected from both side walls thereof to be inserted into said first cam grooves of said disc tray;

an outer chassis having first vertical cut portions formed on side walls thereof to guide an elevating movement of said first shafts;

a pickup feeding device secured to a bottom surface of said base plate;

a compact disc turntable and a minidisc turntable secured respectively to a front center and a rear center of said rectangular cut portion of said base plate; and a loading means for loading and/unloading the disc tray, secured to one side wall of said outer chassis.

2. The disc player as claimed in claim 1, wherein the pickup feeding device includes;

a feeding motor for producing a driving force;

a feeding gear connected to said feeding motor for transmitting the driving force;

a linear gear for converting the driving force transmitted by said feeding gear into a linear driving force to move linearly said pickup; and a guide rod placed thereon in parallel with said linear gear for a linear movement of said pickup.

3. The disc player as claimed in claim 1, wherein the loading means comprises;

a loading motor for producing a driving force;

a transmittance gear for transmitting said driving force of said loading motor; and a carrying gear meshed with said rack gear for converting the driving force transmitted from said transmittance gear into a linear driving force.

4. The disc player as claimed in claim 1, further comprising a photosensor attached to said base plate for sensing whether or not the minidisc and compact disc are mounted thereon.

5. The disc player as claimed in claim 1, wherein second cam grooves are formed on side walls, said base plate includes second shafts to be inserted into said second cam grooves and the outer chassis includes second vertical cut portions formed on side walls thereof for guiding an elevating movement of said second shafts.

6. A player for reproducing a minidisc and compact disc, comprising;

a disc tray having a compact disc mounting part disposed on an upper surface thereof, a minidisc mounting part secured to said upper surface thereof, cut portions formed thereon to expose the minidisc and the compact disc to a pickup in alignment of central points of the minidisc and compact disc mounting parts, first cam grooves, and a rack gear disposed on a lower edge of one side wall of said disc tray, said first cam grooves having a lower cut portion cut horizontally forward from a rear of side walls of said disc tray, an inclination cut portion cut slantly forward from a front end of the lower cut portion and an upper cut portion cut horizontally forward from a front end of the inclination cut portion;

a base plate having a rectangular cut portion formed at a center thereof so that the pickup may read out data from a disc and first shafts projected from both side walls thereof to be inserted into the first cam grooves of said disc tray;

an outer chassis having first vertical cut portions formed on both side walls to guide an elevating movement of said first shafts;

a pickup feeding device secured to a bottom surface of said base plate, said pickup feeding device having a feeding motor for producing a first driving force, a feeding gear connected to the feeding motor for transmitting the first driving force, a linear gear for converting the first driving force transmitted by the feeding gear into a first linear driving force to move linearly said pickup and a guide rod placed on said base plate in parallel with said linear gear for a linear movement of said pickup;

a compact disc turntable and a minidisc turntable secured respectively to a front center and a rear center of said rectangular cut portion of said base plate;

a loading means thereof secured to one side wall of said outer chassis, the loading means having a loading motor for producing a second driving force, a transmittance gear for transmitting said second driving force of said loading motor, and a carrying gear meshed with the rack gear for converting the second driving force transmitted from the transmittance gear into a second linear driving force; and at least two photo sensors secured to said base plate for sensing whether or not the minidisc and the compact disc are mounted thereon.

7. The disc player as claimed in claim 6, wherein said rack gear is formed thereon from an inner end of a lower edge of one side wall of said disc tray to an outer end of a lower edge corresponding to said upper cut portion of said first cam groove.

\* \* \* \* \*